(12) United States Patent
Watarai

(10) Patent No.: US 8,651,993 B1
(45) Date of Patent: Feb. 18, 2014

(54) BICYCLE DRIVE UNIT

(71) Applicant: Shimano Inc., Osaka (JP)

(72) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/718,044

(22) Filed: Dec. 18, 2012

Related U.S. Application Data

(63) Continuation-in-part of application No. 13/608,151, filed on Sep. 10, 2012.

(30) Foreign Application Priority Data

Oct. 12, 2012 (DE) .......................... 10 2012 109 743
Oct. 12, 2012 (TW) .............................. 101137720 A

(51) Int. Cl.
 *F16H 37/08* (2006.01)
(52) U.S. Cl.
 USPC ................ 475/205; 475/5; 475/219; 475/330
(58) Field of Classification Search
 USPC ......... 475/1, 3–5, 8, 149, 151, 152, 198, 204, 475/205, 207, 219, 330
 See application file for complete search history.

(56) References Cited

U.S. PATENT DOCUMENTS

| | | | | |
|---|---|---|---|---|
| 5,845,727 A | * | 12/1998 | Miyazawa et al. | 180/206.4 |
| 6,012,538 A | * | 1/2000 | Sonobe et al. | 180/220 |
| 6,152,249 A | * | 11/2000 | Li et al. | 180/206.6 |
| 6,196,347 B1 | * | 3/2001 | Chao et al. | 180/206.2 |
| 6,296,072 B1 | * | 10/2001 | Turner | 180/220 |
| 6,418,797 B1 | | 7/2002 | Ambrosina et al. | |
| 6,629,574 B2 | | 10/2003 | Turner | |
| 2005/0176542 A1 | * | 8/2005 | Lo | 475/5 |
| 2006/0287151 A1 | * | 12/2006 | Takeda et al. | 475/5 |
| 2011/0168511 A1 | * | 7/2011 | Yamamoto | 192/45 |
| 2011/0251008 A1 | * | 10/2011 | Schmitz et al. | 475/31 |
| 2012/0149516 A1 | * | 6/2012 | Larrabee et al. | 475/5 |
| 2012/0165150 A1 | * | 6/2012 | Chan | 475/8 |

FOREIGN PATENT DOCUMENTS

| | | |
|---|---|---|
| DE | 102010028667 A1 | 11/2011 |
| JP | 8-282575 A | 10/1996 |
| JP | 3029547 U | 10/1996 |
| JP | 11-20772 A | 1/1999 |
| JP | 3985930 B2 | 7/2007 |
| JP | 4036776 B2 | 11/2007 |
| JP | 4056130 B2 | 12/2007 |
| JP | 3146138 U | 11/2008 |

\* cited by examiner

*Primary Examiner* — Justin Holmes
(74) *Attorney, Agent, or Firm* — Global IP Counselors

(57) ABSTRACT

A bicycle drive unit is provided that includes a motor, a crank axle, a power transmission axle and an output part. The motor includes a crank axle receiving hole. The crank axle is rotatably disposed in the crank axle receiving hole of the motor. The power transmission axle is separate from the crank axle and arranged to transmit rotation of the crank axle. The output part is operatively coupled to the motor and the power transmission axle to combine a rotational output of the motor and a rotational output of the transmission mechanism together.

11 Claims, 4 Drawing Sheets

BICYCLE DRIVE UNIT

CROSS-REFERENCE TO RELATED APPLICATIONS

This application claims priority under 35 U.S.C. §119 to Taiwanese Patent Application No. 101137720, filed Oct. 12, 2012 and to German Patent Application No. 102012109743.7 filed Oct. 12, 2012. The entire disclosures of Applications are hereby incorporated herein by reference.

This application is a continuation-in-part application of U.S. patent application Ser. No. 13/608,151, filed on Sep. 10, 2012. The entire disclosure of U.S. patent application Ser. No. 13/608,151 is hereby incorporated herein by reference.

BACKGROUND

1. Field of the Invention

This invention generally relates to a drive unit for an electrically assisted bicycle that uses a motor output as an assisting power.

2. Background Information

One example of an electrically assisted bicycle is disclosed in German Patent Publication No, DE 10 2010 028 667 in which the electrically assisted bicycle uses a motor output as an assisting power to drive the bicycle. In the electrically assisted bicycle disclosed in this German Patent Publication, a pedaling force, which is inputted by the pedals, is transmitted through the transmission mechanism and the transmitted drive force is then combined with a drive force from the motor. The combined drive force is then transmitted to a rear wheel of the bicycle to rotate the rear wheel.

SUMMARY

It has been found that with the drive unit of the above mentioned German Patent Publication, the drive unit becomes large due to the power transmission paths from the crank axle and the axle of the motor to the sprocket 28 being separated.

The present invention was conceived in view of the problem described above. One object proposed by this disclosure is to provide a lighter, more compact drive unit for a bicycle which has a motor for assisted riding.

In view of the state of the known technology and to achieve the object described above, the bicycle drive unit is provided that comprises a motor, a crank axle, a power transmission axle and an output part. The motor includes a crank axle receiving hole. The crank axle is rotatably disposed in the crank axle receiving hole of the motor. The power transmission axle is separate from the crank axle and arranged to transmit rotation of the crank axle. The output part is operatively coupled to the motor and the power transmission axle to combine a rotational output of the motor and a rotational output of the transmission mechanism together.

In this manner, since the crank axle can be inserted in the hole in the motor and a sensor unit can be arranged inside the hole in the motor, the bicycle drive unit can be made lighter and more compact.

Furthermore, in the bicycle drive unit, it is preferable for the power transmission axle to be coupled to the crank axle at a first end of the motor in an axial direction of the crank axle and coupled to the output part at a second end of the motor. In this manner, the motor which has a relatively large weight can be arranged in the vicinity of the center of the drive unit in the axial direction of the crank axle.

Furthermore, it is preferable for the bicycle drive unit to be provided with a first coupling mechanism coupling the crank axle and the power transmission axle, and a second coupling mechanism coupling the power transmission axle and the output part.

Furthermore, in the bicycle drive unit, it is preferable for the motor to have a rotational axis that is coaxially aligned with the rotational axis of the crank axle.

Furthermore, it is preferable for a sprocket to be connected to the output part. In this manner, the output from the output part can be transmitted to a rear hub or the like.

Furthermore, it is preferable or the bicycle drive unit to further have a one-way clutch to transmit the output of the motor to the output part. In this manner, the rotational force of the crank axle can be prevented from being transmitted to the motor.

Furthermore, it is preferable for the bicycle drive unit to further have a reduction gear mechanism to transmit the output of the motor to the output part. In this manner, since the speed of the motor output can be reduced and transmitted to the output part, it is possible to realize a power transmission section which allows the motor to be operated efficiently.

Furthermore, it is preferable for the bicycle drive unit to further have a reduction gear mechanism, the output of the motor being inputted to the reduction gear mechanism, and the output of the reduction gear mechanism being transmitted to the output part through a one-way clutch. In this manner, it is possible to realize prevention of the rotational power of the crank axle being transmitted to the motor as well as efficient operation of the motor.

Furthermore, in the bicycle drive unit, it is preferable for the first coupling mechanism to include one of a gear, a sprocket and a pulley, and Furthermore, in the bicycle drive unit, it is preferable for the second coupling mechanism to include one of a gear, a sprocket and a pulley.

Furthermore, in the bicycle drive unit, it is preferable for the output part to have a rotational axis that is axially aligned with the rotational axis of the crank axle. In this manner, since the bearings of the rotational axis of the output part and the rotational axis of the crank axle can be integrated, the bicycle drive unit can be made even lighter and more compact.

Furthermore, it is preferable for the output part to have a first joining section which is joined to the power transmission axle and a second joining section which is joined to the motor. Here, it is preferable for the first joining section to have an externally toothed gear wheel. In addition, it is preferable for the second joining section to have an internally toothed gear wheel. In this manner, the drive unit can combine the rotary torque of the crank axle and the rotary torque of the motor.

According to the bicycle drive unit of the present disclosure, a bicycle drive unit, which has a motor for assisted riding, can be realized that is lighter and more compact.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
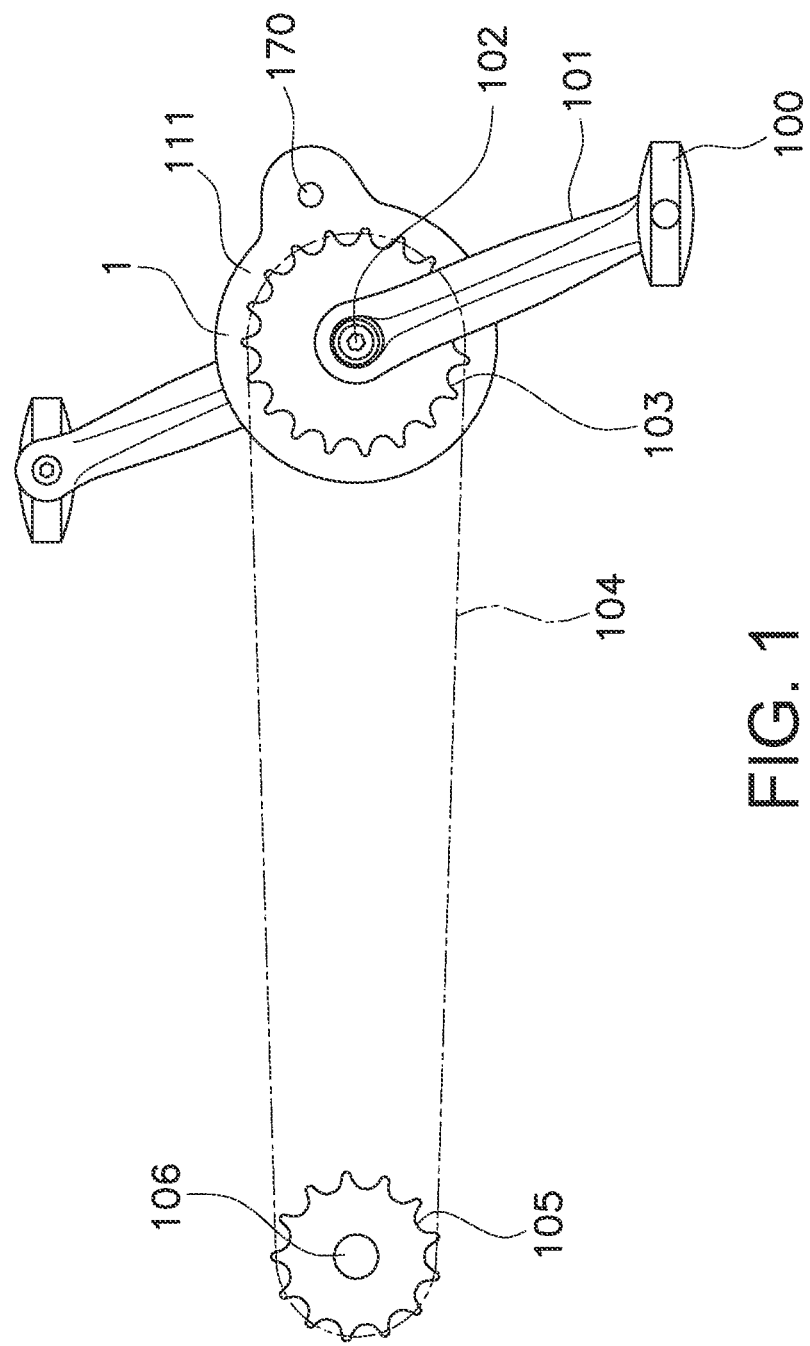
FIG. 1 is a simplified side elevational view of an electrically assisted bicycle equipped with a drive unit according to a first embodiment.

Referring initially to FIG. 1, a bicycle drive unit 1 is illustrated in accordance with a first embodiment. In particular, FIG. 1 is a simplified, right side elevational view of an electrically assisted bicycle having the drive unit 1, as described below. The electrically assisted bicycle has a pair of pedals 100. The pedals 100 are each rotatably mounted to a crank arm 101. The crank arms 101 are fixed to an end so a crank axle 102 that is operatively connected to a front sprocket 103 via the drive unit 1. The front sprocket 103 drives a chain 104 which in turn drives a rear sprocket 105. The rear sprocket 105 is mounted to a wheel axle 106 of a rear wheel. Thus, in this electrically assisted bicycle, a pedaling force acting on the pedals 100 is transmitted along the following path: the crank arms 101→the drive unit 1→a front sprocket 103→a chain 104→a rear sprocket 105→a hub body which rotates about the wheel axle 106 of the rear wheel.

As explained below, the drive unit 1 includes an assistance motor 120 that supplements the pedaling force of the rider. In the first embodiment, the crank axle 102 and the output shaft of the motor 120 are coaxial. With this arrangement, the pedaling force is combined with the assisting force provided by a motor output of the motor 120 such that a combined output force is transmitted to the rear wheel.

Normally, a torque detecting device or sensor unit detects a torque acting on the crank axle 102 as described later. Then, when the detected value exceeds a set value, the assistance motor 120 is started to generate an assisting torque (i.e., assisting power) corresponding to the amount by which the detected torque from the pedaling power is insufficient. The drive unit 1 which includes the assistance motor 120 is typically arranged in the vicinity of a frame joint portion where a bottom end portion of a seat tube of the frame and a rearward end portion of the down tube of the frame join together. A battery is typically arranged on a rear carrier, the down tube, or the seat tube for providing electrical driving power to drive the motor 120.

Figure 2:
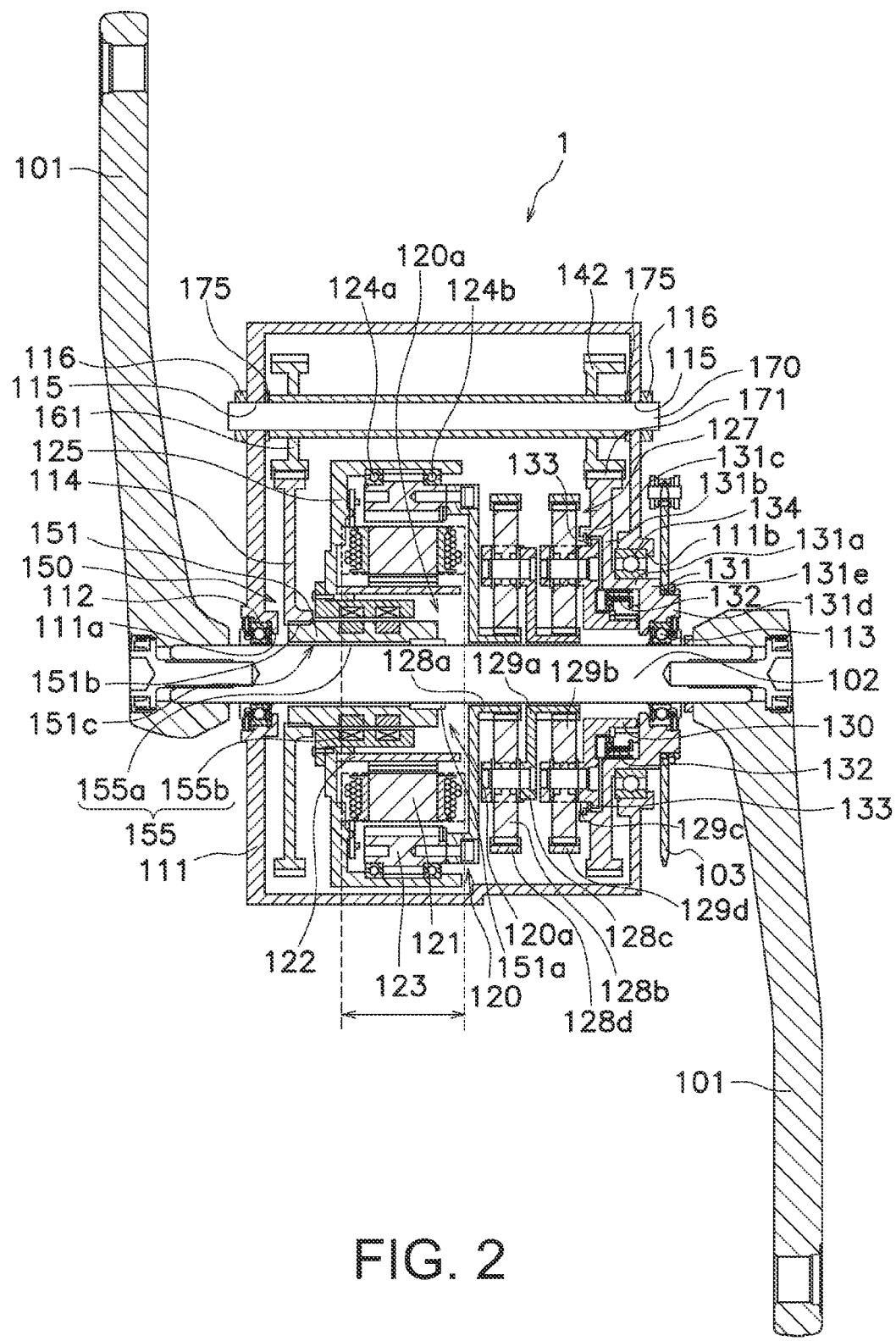
FIG. 2 is a cross sectional view of a drive unit according to the first embodiment.

In the first embodiment, the drive unit 1 is configured such that the rotational axis of the crank axle 102 and the rotational axis of the assistance motor 120 are coaxial. The structure and function of the drive unit 1 will be explained below with reference to FIG. 2. Referring to FIG. 2, the assistance motor 120 which has a crank axle receiving hole 120a in which the crank axle 102 is rotatably disposed. A sensor unit 150 is at least partially arranged between the motor 120 and the crank axle 102 inside the crank axle receiving hole 120a.

As shown in FIG. 2, in this drive unit 1, the crank axle 102 is inserted into a through hole 111a of a casing 111. The crank axle 102 is rotatably supported by the casing 111 so as to freely rotate through a pair of roller bearings 112 and 113. The crank arms 101 are detachably mounted on opposite ends of the crank axle 102 using bolts. The crank arms 101 are arranged on the exterior of the casing 111. One of the crank arms 101 among the two crank arms 101 can be configured so as to not be detachable from the crank axle 102.

The motor 120 is an electric motor that has the crank axle receiving hole 120a in which the crank axle 102 is rotatably arranged. The crank axle receiving hole 120a is provided in a rotation center section of the motor 120. The motor 120 is arranged such that its rotational axis is the same axis as the rotational axis of the crank axle 102. In other words, the rotational axis of the assistance motor 120 is coincident with the rotational axis of the crank axle 102.

The motor 120 basically includes a stator 121, a mounting structure 122 and a rotor 123. The stator 121 of the motor 120 is formed in a cylindrical shape. The stator 121 is arranged coaxially with the crank axle 102. A field coil is wound onto the stator 121. The stator 121 is fixed to a motor case 125 with the mounting structure 122. The motor case 125 is fixed to the casing 111. The crank axle receiving hole 120a is formed at an inner side in the radial direction of the stator 121. The rotor 123 is formed in a cylindrical shape. The rotor 123 is rotatably supported around the crank axle 102 by the motor case 125 so as to freely rotate. The rotor 123 has, for example, a plurality of magnets (not shown) having a plurality of magnetic poles. The magnetic poles of the rotor 123 are arranged along a circumferential direction with a magnet holding section (not shown) holding the magnets. In this embodiment, the motor 120 is an outer rotor type motor in which an outer perimeter of the stator 121 is surrounded by the rotor 123. The rotor 123 is rotatably supported on the crank axle 102 with a first bearing 124a and a second bearing 124b so as to freely rotate about the crank axle 102. The first and second bearings 124a and 124b are arranged to be spaced apart in the crank axle direction of the crank axle 102. The first bearing 124a and the second bearing 124b are supported by the motor case 125. Here, the motor 120 is driven by an inverter which is not shown in the drawings. The inverter is driven by a control section which is not shown in the drawings, and the controller controls the inverter according to the pedaling force and a detected speed of the bicycle using known technology.

The sensor unit 150 detects a twisting force, which is applied to the crank axle 102. Since this twisting is proportional to the pedaling force of the user which is applied to the crank axle 102, the pedaling force of the user which is applied to the crank axle 102 can be understood by detecting the twisting. The sensor unit 150 includes a hollow member 151 and a strain sensor 155. The hollow member 151 has an insertion hole into which the crank axle 102 can be arranged. The hollow member 151 is provided with a first connection section 151a, a second connection section 151b and an insertion hole 151c. The first connection section 151a is connected to the crank axle 102. The second connection section 151b transmits the rotational force to the power transmission axle to be described later. The crank axle 102 can be arranged in the insertion hole 151c. Except for the first connection section 151a, the hollow member 151 is separated from the crank axle 102, which is arranged at an inner side. In the first connection section 151a, the hollow member 151 is inserted with a key or a serration which protrudes from the crank axle 102 and is fixed by means of screwing, press fitting, or the like. The first connection section 151a and the second connection section 151b are provided to be separated in the direction of the crank axle 102. The strain sensor 155 is preferably a magnetostrictive sensor that includes a magnetostrictive element 155a and a detection coil 155b. The magnetostrictive element 155a is provided in the hollow member 151. The detection coil 155b is provided at the periphery of the magnetostrictive element 155a. The detection coil 155b is fixed to the motor case 125 by a fixing member 156. In this manner, the detection coil 155b is supported by the casing 111 so as not to be able to rotate.

One part of the sensor unit 150 is at least partially arranged between the motor 120 and the crank axle 102. A region between the crank arms 101 is between the motor 120 and the crank axle 102 in the embodiment with a range W between both ends of the stator 121 in the direction in which the rotational axis of the motor 120 extends. In the sensor unit 150, at least one part or all of the strain sensor 155 is preferably provided in the region along the crank axle 102 and between both ends of the stator 121 in the direction in which the rotational axis of the motor 120 extends. At least one part or all of the strain sensor 155 can be provided in a region along the crank axle 102 in the range W between both ends of the stator 121 in the direction in which the rotational axis of the motor 120 extends and in a range overlapping with the rotor 123 in the direction in which the rotational axis of the assistance motor 120 extends.

A reduction gear mechanism 127 transmits rotation of the rotor 123 to a torque transmitting member 130. The reduction gear mechanism 127 includes one or more gears. The example of FIG. 2 shows a case in which the gear reduction mechanism 127 has two planetary gear mechanisms. A first planetary gear mechanism includes a first sun gear 128a, a plurality of first planetary gears 128b, a first carrier 128c and a first ring gear 128d. The first sun gear 128a is coupled to the rotor 123. The first carrier 128c supports the first planetary gears 128b so as to be able to rotate. The first ring gear 128d is fixed to the casing 111. A second planetary gear mechanism includes a second sun gear 129a, a plurality of second planetary gears 129b, a second carrier 129c and a second ring gear 129d. The second sun gear 129a is coupled to the first carrier 128c. The second carrier 129c supports the plurality of second planetary gears 129b so as to be able to rotate. The second ring gear 129d is fixed to the casing 111.

The output of the gear reduction mechanism 127 is transmitted to an output part 131 (described in detail later) through the torque transmitting member 130. The torque transmitting member 130 is joined to the second carrier section 129d so as to be formed as unitary body. The torque transmitting member 130 is supported so as to be able to rotate on an inside face (described in detail later) of the output part 131 through a one-way clutch 132 and a rotation supporting part 133. The rotation supporting part 133 is configured as a sliding bearing in the embodiment, but can be configured by a ball bearing. The rotation supporting part 133 is arranged farther to an outer side than the one-way clutch 132 in a radial direction with relation to the crank axle 102. The torque transmitting member 130 supports a plurality of clutch pawls of the one-way clutch 132.

The output part 131 transmits rotational force of the motor 120 and rotational force of the crank axle 102 to the front sprocket 103. The output part 131 is provided on an end portion side of the crank axle 102. The output part 131 is formed in an annular shape. The output part 131 has a first annular portion 131a, a second annular portion 131b and a third annular portion 131c. The first annular portion 131a extends along the crank axle 102. The second annular portion 131b extends in the radial direction with respect to the crank axle 102 from the end portion of the motor side of the first annular portion 131a. The third annular portion 131.c extends in a direction parallel to the crank axle 102 from the end portion of the motor side of the second annular portion 131b. An inner circumferential portion of the output part 131 is coupled to the torque transmitting member 130 through the one-way clutch 132. A clutch groove of the one-way clutch 132 is formed in an inner circumferential portion of the first annular portion 131a and the second annular portion 131b. The clutch groove is a second coupling section and configures an internally toothed gear wheel. The rotation supporting part 133 is provided on an inner circumferential portion of the third annular portion 131c. The rotation supporting part 133 supports the rotation of the torque transmitting member 130. A fourth annular portion 131d extends to an inner side in the circumferential direction. The fourth annular portion 131d is provided at the end portion of the first annular portion 131a, which is the opposite side to the second annular portion 131b. A bearing 113 is provided on an inner circumferential portion of the fourth annular portion 131d. The bearing 134 is provided on an outer circumferential portion of the first annular portion 131a. In this manner, the output part 131 is supported by the casing 111 so as to be able to rotate. The bearings 113 and 134 are formed as, for example, radial bearings, such that the inner ring body of the bearing 113 supports the crank axle 102, and the outer ring body of the bearing 134 is supported by the casing 111. The end portion of the fourth annular portion 131d of the output part 131 protrudes to the outside from an opening 111b of the casing 111. The output part 131 is provided with a sprocket connection section 131e in the outer circumferential portion of the portion which protrudes from the casing 111 of the fourth annular portion 131d. A front sprocket 103 is removably attached to the sprocket connection section 131d with, for example, a bolt. In this manner, the front sprocket 103 is able to rotate integrally with the output part 131.

The rotational force according to the second connection section 151b of the sensor unit 150 is transmitted to the power transmission axle 160 through a first gear wheel 114 and a second gear wheel 161. In addition, the rotation of the power transmission axle 160 is transmitted to the output part 131 through a third gear wheel 142.

The second connection section 151b of the sensor unit 150 is coupled to the first gear wheel 114. The first gear wheel 114 is provided at the end portion of the output part 131 which is the opposite side to the end portion of the crank axle 102. Along with this, the first connection section 151a of the sensor unit 150 is provided at the output part side of the output part 131. The first connection section 151a is coupled to the crank axle 102 in a region between the assistance motor 120 and the crank axle 102. The first gear wheel 114 is fixed to the second connection section 151b and rotates integrally with the crank axle 102. The first gear wheel 114 can be detachably mounted on the second connection section 151b using, for example, serrations. Except for the first connection section 151a, the hollow member 151 is separated from the crank axle 102 which is arranged at an inner side. Thus, the first gear wheel 114 and the second gear wheel 161 form a first coupling mechanism.

The second gear wheel 161 is fixed to the power transmitting axle 160 so as to not be able to rotate and rotates integrally therewith. The second gear wheel 161 is provided on one end portion of the power transmitting axle 160. The second gear wheel 161 meshes with the first gear wheel 114.

The power transmission axle 160 is supported by a supporting axle 170 to freely rotate. The supporting axle 170 is provided to be separated from the crank axle 102. In other words, the power transmission axle 160 is provided to be separated from the crank axle 102. The rotational axis of the power transmission axle 160 is parallel to the rotational axis of the crank axle 102. At least one of the supporting axle 170 and the power transmission axle 160 can be provided with a regulating member 175 which regulates the movement of the power transmission axle 160 in the axial direction of the supporting axle 170. In the embodiment, the power transmission axle 160 and the supporting axle 170 form a sliding bearing.

A supporting axle 170 has first female threaded portions (not shown), which are for fixing to an insertion opening 115 which is formed in the casing 111 using a nut 116, at both end portions thereof. Rotation preventing sections (not shown) are formed parallel and prevent the rotation in the insertion opening 115. These rotation preventing sections are respectively formed in the first female threaded portions 24.

A third gear wheel 142 is fixed to the other end portion of the power transmission axle 160 so as not to be able to rotate. A fourth gear 171 is formed at an outer circumference of the output part 131. The fourth gear 171 is configured as an externally toothed gear wheel which constitutes a first coupling section. The fourth gear 171 is formed at the outer circumference of the second annular portion 131b and the third annular portion 131c. In the embodiment, the fourth gear 171 is formed integrally with the output part 131. The fourth gear 171 meshes with the third gear wheel 142. Thus, the third gear wheel 142 and the fourth gear 171 form a second coupling mechanism.

The first coupling mechanism (e.g., the first gear wheel 114 and the second gear wheel 161) and the second coupling mechanism (e.g., the third gear wheel 142 and the fourth gear 171) are arranged on the opposite side of the output part 131 and the front sprocket 103 to interpose the motor 120. In this manner, the power transmission axle 160 is coupled to the crank axle at one end of the motor 120 in the axial direction of the crank axle and coupled to the output part 131 at the other end of the motor 120.

Next, the operation of the drive unit will be described. A torque which is due to the pedaling force of a rider is transmitted through the transmission mechanism from the crank 101→the crank axle 102→the first connection section 151a→the second connection section 151b→the first gear wheel 114→the second gear wheel 161→the power transmission axle 160→the third gear wheel 142→the output part 131. On the other hand, output torque from the motor 120 is transmitted from the reduction gear mechanism 127→the torque transmitting member 130→the one-way clutch 132→the output part 131. The output part 131 combines the two torques and transmits the combined torque to the front sprocket 103. In this way, assistance using the motor is realized.

In the drive unit 1 of the first embodiment, the rotation axis of the crank axle 102 and the rotation axis of the motor 120 are the same axis and at least a part of the sensor unit 150 is arranged in the hole 120a of the motor 120 in which the crank axle 102 is arranged. In this manner, the drive unit 1 which has the motor 120 for assisted riding can be configured to be lightweight and compact.

In addition, by adjusting the gear ratios (number of gears) of the first to fourth gear wheels 114, 161, 142, and 171 in advance, it is possible to increase or decrease the number of rotations of the output part 131 with respect to the number of rotations of the crank axle 102. In this manner, setting can be performed according to the user of the bicycle which is provided with the drive unit 1.

Figure 3:
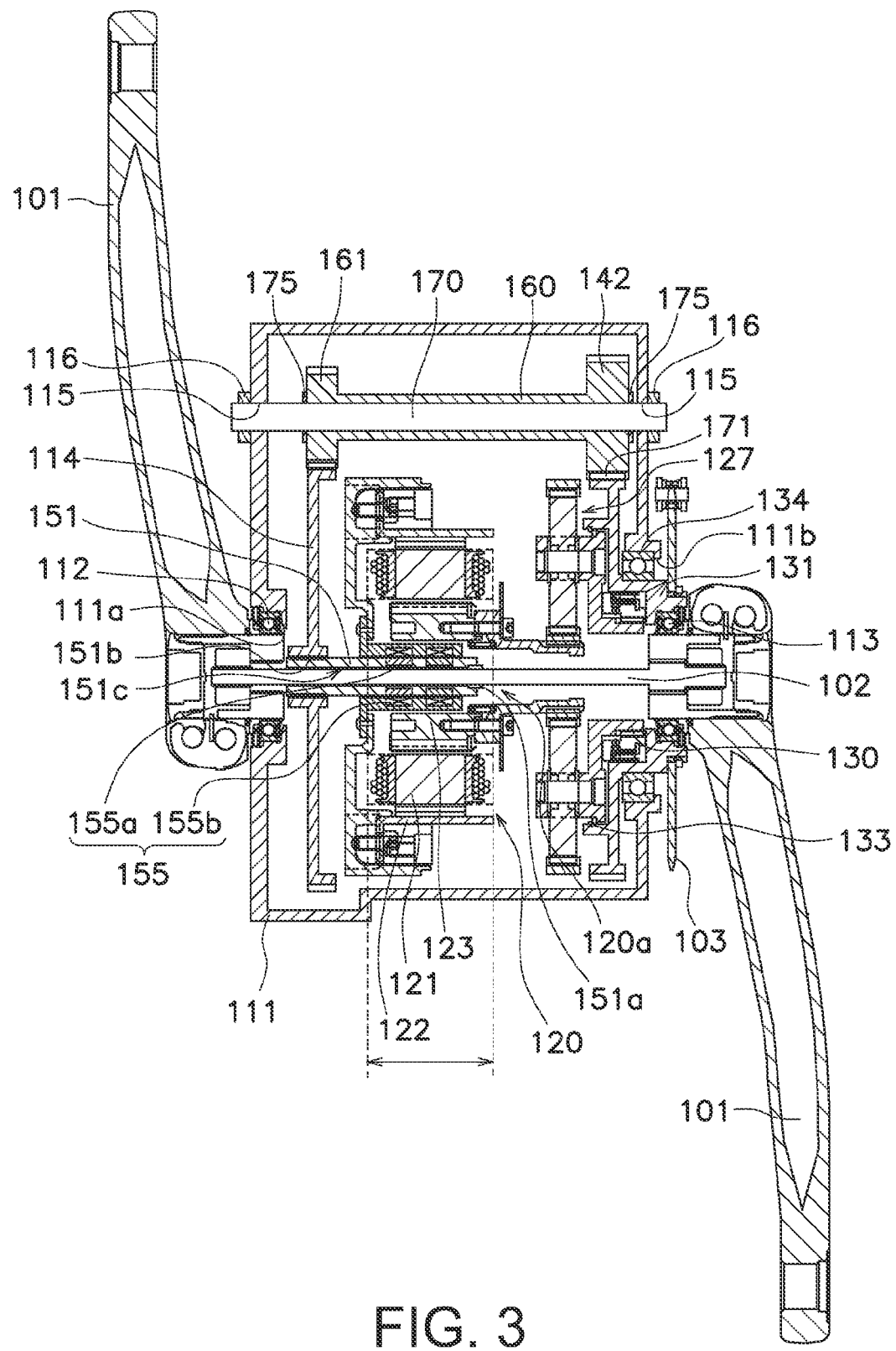
FIG. 3 is a cross sectional view of a drive unit according to a second embodiment.

FIG. 3 is a cross sectional view of the drive unit according to a second embodiment. The drive unit 1 according to the second embodiment differs from the drive unit according to the first embodiment primarily in the following ways. The motor 120 is an inner rotor type motor in which the stator 121 is provided to surround the outer perimeter of the rotor 123. In the following description, detailed description will be given of the content which is different to the first embodiment. Here, for convenience, FIG. 3 illustrates a case where the reduction gear mechanism 127 has one gear, but this is only for illustration. The functions of the reduction gear mechanism 127 are the same as those of the first embodiment.

The second connection section 151b of the sensor unit 150 is coupled to the first gear wheel 114. The first gear wheel 114 is fixed to the second connection section 151b and rotates integrally with the crank axle 102. The first gear wheel 114 can be detachably mounted on the second connection section 151b using, for example, serrations. The first connection section 151a is coupled to the crank axle 102 in a region between the motor 120 and the crank axle 102. Except for the first connection section 151a, the hollow member 151 is separated from the crank axle 102 which is arranged at an inner side.

The second gear wheel 161 meshes with the first gear wheel 114. In the second embodiment, the second gear wheel 161 is formed integrally with the power transmission axle 160. In addition, the third gear wheel 142 is formed integrally with the power transmission axle 160. In the embodiment, the power transmission axle 160 is integrally formed with the second gear wheel 161 and the third gear wheel 142, but the power transmission axle 160 can be integrally formed with at least either one of the second gear wheel 161 and the third gear wheel 142. In the embodiment, one part of the sensor unit 150 is at least partially arranged between the motor 120 and the crank axle 102, and at least one part or all of the strain sensor 155 is provided in a region along the crank axle 102 in the range W between both ends of the stator 121 in the direction in which the rotational axis of the motor 120 extends.

In the embodiment described above, a case where the strain sensor 155 is a magnetostrictive sensor has been illustrated, but the strain sensor 155 can be a strain gauge or a semiconductor strain sensor. In addition, a case where the magnetostrictive element 155a is arranged in the hollow member 151 has been illustrated, but the magnetostrictive element 155a can be directly arranged in the crank axle 102. In this case, the first gear wheel 114 is directly fixed to the crank axle 102 without providing the hollow member 151.

Figure 4:
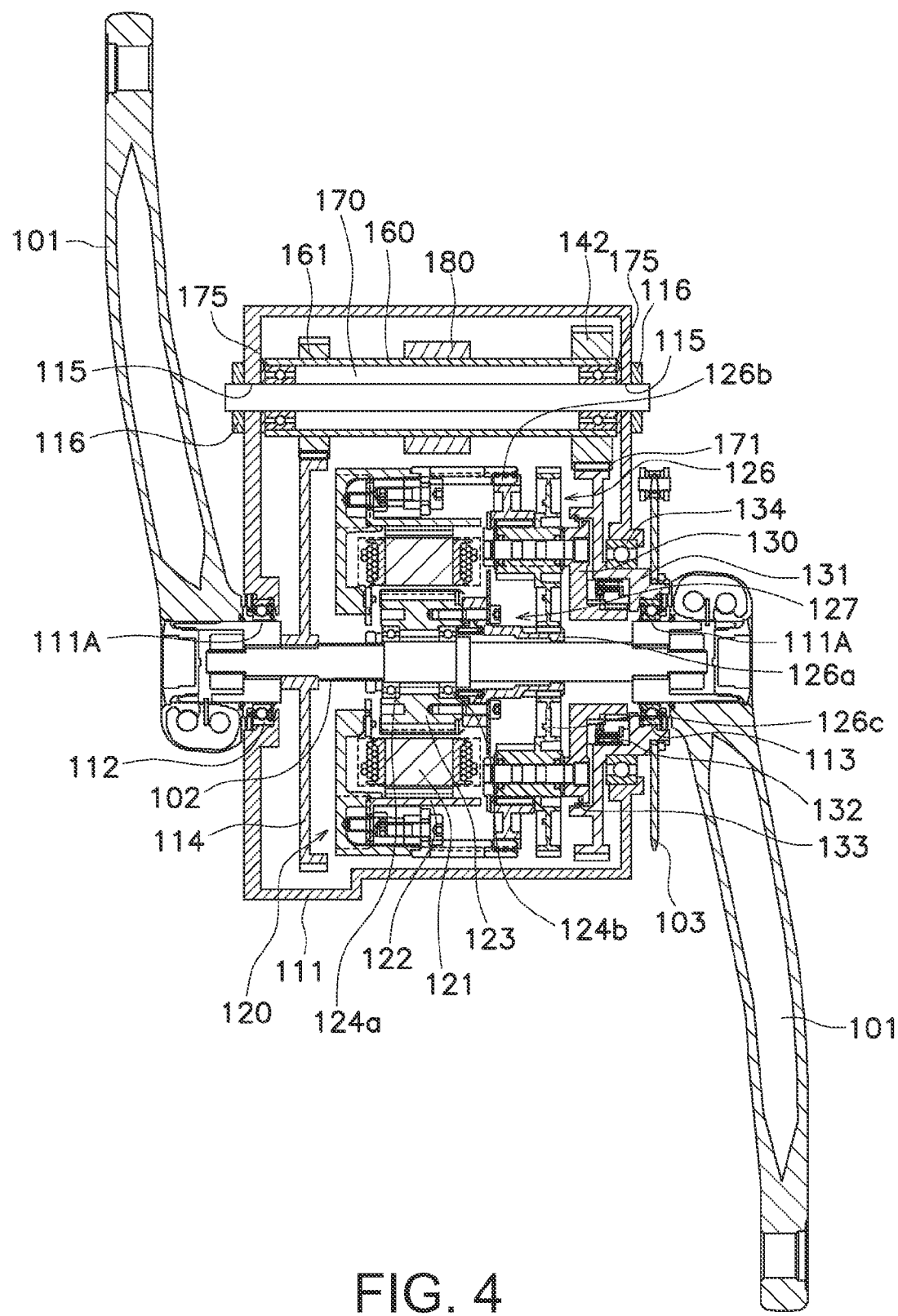
FIG. 4 is a cross sectional view of a drive unit according to a third embodiment.

FIG. 4 is a cross sectional view of the drive unit according to a third embodiment. The drive unit according to the third embodiment differs from the drive unit according to the first embodiment primarily in the following ways. There are differences in that the motor 120 is an inner rotor type motor in which the stator 121 is provided to surround the outer perimeter of the rotor 123, and there is a detection means (torque detection means) for detecting human driving force. In the following description, detailed description will be given of the content which is different to the first embodiment. Here, for convenience, FIG. 4 illustrates a case where the reduction gear mechanism 127 has one gear, but this is only for illustration. The functions of the reduction gear mechanism 127 are the same as those of the first embodiment. In addition, the same reference numerals are used where the configuration is the same as the embodiments described above.

Similar to the first embodiment, the motor (electric motor) 120 is arranged such that the rotational axis thereof is the same axis as the rotational axis of the crank axle 102. The stator 121 is arranged coaxially with the crank axle 102. A field coil is wound onto the stator 121. The stator 121 is fixed to a motor case 125 with the mounting structure 122. The rotor 123 is formed in a cylindrical shape. The rotor 123 is rotatably supported around the crank axle 102 by the motor case 125 so as to freely rotate. The rotor 123 has, for example, a plurality of magnets (not shown) having a plurality of magnetic poles. The magnetic poles of the rotor 123 are arranged along a circumferential direction with a magnet holding section (not shown) holding the magnets. In the second embodiment, the motor 120 is an inner rotor type motor in which the rotor 123 is provided to surround the outer perimeter of the stator 121. The rotor 123 is rotatably supported on the crank axle 102 with a first bearing 124a and a second bearing 124b so as to freely rotate about the crank axle 102. The first and second bearings 124a and 124b are arranged to be spaced apart in the crank axle direction of the crank axle 102. The first bearing 124a and the second bearing 124h are supported by the motor case 125. Here, the motor 120 is driven by an inverter which is not shown in the drawings. The inverter is driven by a control section which is not shown in the drawings, and the controller controls the inverter according to the pedaling force and a detected speed of the bicycle using known technology.

The reduction gear mechanism 127 transmits rotation of the rotor 123 to the torque transmitting member 130 and transmits rotation of the torque transmitting member 130 to the rotor 123. The reduction gear mechanism 127 has a planetary gear mechanism 126. The planetary gear mechanism 126 has a sun gear 126a, an internally toothed gear 126b and a plurality of (for example, three) planet gears 126c. The sun gear 126a is fixed to the rotor 123. The internally toothed gear 126b is provided on the mounting structure 122. The internally toothed gear 126b is arranged around the outside circumference of the sun gear 126a. The planet gears 126c are supported so as to be able to rotate by the torque transmitting member 130. The planet gears 126c mesh with the sun gear 126a and the internally toothed gear 126b. The torque transmitting member 130 is a so-called carrier. Each of the planet gears 126c has a first gear section and a second gear section which have a different number of teeth. The number of teeth in the first gear section is greater than the number of teeth than the second gear section. The first gear section meshes with the sun gear 126a, while the second gear section meshes with the internally toothed gear 126b. The torque transmitting member 130 is supported by an inside face of the output part 131 so as to be able to rotate through the one-way clutch 132 and the rotation supporting part 133. The rotation supporting part 133 is configured as a sliding bearing in the embodiment, but can be configured by a ball bearing. The rotation supporting part 133 is arranged farther to an outer side than the one-way clutch 132 in a radial direction with relation to the crank axle. In this planetary gear mechanism 126, since the internally toothed gear 126b is fixed so as not to be able to rotate with respect to the casing 111, the speed of the rotation of the sun gear 126a to which the rotor 123 is coupled is reduced and transmitted to the torque transmitting member 130.

The first coupling mechanism is provided with a first gear wheel 114 and a second gear wheel 141 and couples the crank axle 102 and the power transmission axle 160. The first gear wheel 114 is provided on one end portion side of the crank axle 102. The first gear wheel 114 is fixed to the crank axle 102 and rotates integrally with the crank axle 102. The first gear wheel 114 can be detachably mounted to the crank axle 102 using, for example, serrations. The second gear 141 meshes with the first gear wheel 114 and transmits driving power to the power transmission axle 160.

In the embodiment, the power transmission axle 160 is supported by a supporting axle 170 using a ball bearing on as to freely rotate. A sensor unit 180 for detecting the driving power imparted to the power transmission axle 160 is provided in the power transmission axle 160. The second coupling mechanism is provided with a third gear wheel 142 and a fourth gear wheel 171 and couples the power transmission axle 160 and the output part 131. The third gear wheel 142 is fixed to the other end portion of the power transmission axle 160 so as not to be able to rotate and meshes with the fourth gear wheel 171 which is provided in the output part 131. The sensor unit 180 detects twisting force, which is applied to the power transmission axle 160. Since this twisting is proportional to the pedaling force of the user which is applied to the crank axle 102, the pedaling force of the user which is applied to the crank axle 102 can be understood by detecting the twisting of the power transmission axle 160. The sensor unit 180 is configured by the strain sensor 155. The strain sensor is a magnetostrictive sensor and, in the embodiment, is provided with a magnetostrictive element which is provided in the power transmission axle 160 and a detection coil which is provided at the periphery of the magnetostrictive element. The sensor unit 180 has the same configuration as the sensor unit 150 described above. The detection coil is fixed to the motor case 111.

In the embodiment, a case where the strain sensor is a magnetostrictive sensor has been illustrated, but the strain sensor 155 can be a strain gauge or a semiconductor strain sensor. In this case, a transmitter which transmits a signal from the strain sensor which is provided in the power transmission axle 160 to the outside wirelessly or the like and a receiver which receives the signal from the transmitter can be further provided. In the embodiments described above, the transmission of the driving power (torque and rotation) from the crank axle 102 to the power transmission axle 160 and the transmission of the torque from the power transmission axle 160 to the output part 131 are performed using gears, but the transmission of the torque can be performed using a sprocket and a chain, or a pulley and a belt.

In addition, the first coupling mechanism is formed by the first gear wheel 114 and the second gear wheel 141 and the second coupling mechanism is formed by the third gear wheel 142 and the fourth gear wheel 171, but each of the coupling mechanisms can be configured using three or more gear wheels.

In addition, if the motor 120 can be driven at a low speed, the reduction gear mechanism 127 can be omitted. In this case, the motor output is transmitted to the one-way clutch 132 as it is.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   a motor including a crank axle receiving hole;
   a crank axle rotatably disposed in the crank axle receiving hole of the motor;
   a power transmission axle separate from the crank axle and arranged to transmit rotation of the crank axle; and an output part operatively coupled to the motor and the power transmission axle to combine a rotational output of the motor and a rotational output of the power transmission axle together, the power transmission axle being coupled to the crank axle at a first end side of the motor in an axial direction of the crank axle, and being coupled to the output part at a second end of the motor.

2. The bicycle drive unit according to claim 1, further comprising
   a first coupling mechanism coupling the crank axle and the power transmission axle; and
   a second coupling mechanism coupling the power transmission axle and the output part.

3. The bicycle drive unit according to claim 2, wherein
   the first coupling mechanism includes one of a gear, a sprocket and a pulley, and
   the second coupling mechanism includes one of a gear, a sprocket and a pulley.

4. The bicycle drive unit according to claim 1, wherein
   the motor has a rotational axis that is coaxially aligned with the rotational axis of the crank axle.

5. The bicycle drive unit according to claim 1, further comprising a sprocket is connected to the output part.

6. The bicycle drive unit according to claim 1, further comprising a one-way clutch transmitting the output of the motor to the output part.

7. The bicycle drive unit according to claim 1, further comprising a reduction gear mechanism transmitting the output of the motor to the output part.

8. The bicycle drive unit according to claim 1, further comprising
   a reduction gear mechanism,
   the output of the motor being inputted to the reduction gear mechanism, and
   the output of the reduction gear mechanism being transmitted to the output part through a one-way clutch.

9. The bicycle drive unit according to claim 1, wherein
   the output part has a rotational axis that is axially aligned with the rotational axis of the crank axle.

10. The bicycle drive unit according to claim 1, wherein
   the output part has a first joining section which is joined to the power transmission axle and a second joining section which is joined to the motor.

11. The bicycle drive unit according to claim 10, wherein
   the first joining section has an externally toothed gear wheel, and
   the second joining section has an internally toothed gear wheel.

\* \* \* \* \*